United States Patent
Tobe et al.

(10) Patent No.: US 8,789,064 B2
(45) Date of Patent: Jul. 22, 2014

(54) MOBILE DEVICE AND APPLICATION SWITCHING METHOD

(75) Inventors: Akiko Tobe, Yokosuka (JP); Nirou Tsuchiya, Yokohama (JP); Masayuki Tsuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 547 days.

(21) Appl. No.: 13/125,401

(22) PCT Filed: Oct. 28, 2009

(86) PCT No.: PCT/JP2009/068492
§ 371 (c)(1),
(2), (4) Date: Jul. 28, 2011

(87) PCT Pub. No.: WO2010/050502
PCT Pub. Date: May 6, 2010

(65) Prior Publication Data
US 2011/0283291 A1    Nov. 17, 2011

(30) Foreign Application Priority Data

Oct. 30, 2008   (JP) ............................... P2008-280253

(51) Int. Cl.
*G06F 9/46*   (2006.01)
(52) U.S. Cl.
USPC ...................................................... 718/104
(58) Field of Classification Search
None
See application file for complete search history.

(56) References Cited

U.S. PATENT DOCUMENTS

| | | | |
|---|---|---|---|
| 7,207,042 B2 * | 4/2007 | Smith et al. ................... | 718/104 |
| 7,664,860 B2 * | 2/2010 | Beck et al. .................... | 709/227 |
| 2004/0023646 A1 | 2/2004 | Inami et al. | |
| 2004/0261077 A1 | 12/2004 | Kozaki et al. | |
| 2008/0244600 A1 * | 10/2008 | Wong et al. ................... | 718/104 |

FOREIGN PATENT DOCUMENTS

| | | |
|---|---|---|
| JP | 4-105132 | 4/1992 |
| JP | 5 73326 | 3/1993 |
| JP | 7 210404 | 8/1995 |
| JP | 8 297580 | 11/1996 |
| JP | 2003 15892 | 1/2003 |
| JP | 2004-78889 | 3/2004 |

(Continued)

OTHER PUBLICATIONS

International Search Report Issued Dec. 28, 2009 in PCT/JP09/068492 filed Oct. 28, 2009.
Office Action issued Jun. 5, 2012 in Japanese Patent Application No. 2008-280253 (with English translation).

(Continued)

*Primary Examiner* — Van Nguyen
(74) *Attorney, Agent, or Firm* — Oblon, Spivak, McClelland, Maier & Neustadt, L.L.P.

(57) ABSTRACT

An object is to switch executions of applications appropriately from one to another when a plurality of applications use a limited resource. A mobile device (1) is provided with an execution state shift unit (61) for shifting an execution state between a multiplex-execution state and a single-execution state in a multi-application execution environment, a resource release unit (62) for releasing a resource used by applications being executed in the multi-application execution environment, an application stop unit (63) for stopping an application other than the application to be executed in the single-execution state, and a resource allocation unit (64) for allocating the resource released by the resource release unit (62) to the application to be executed in the single-execution state when the execution state is shifted from the multiplex-execution state to the single-execution state by the execution state shift unit (61).

20 Claims, 8 Drawing Sheets

(56) References Cited

FOREIGN PATENT DOCUMENTS

| | | |
|---|---|---|
| JP | 2004 78936 | 3/2004 |
| JP | 2005 4581 | 1/2005 |
| JP | 2006 146910 | 6/2006 |
| JP | 2008 117181 | 5/2008 |

OTHER PUBLICATIONS

International Preliminary Report on Patentability issued Jun. 7, 2011 in PCT/JP09/068492 Oct. 28, 2009.

Japanese Office Action issued Oct. 11, 2011, in Patent Application No. P2008-280253. (with English translation).

* cited by examiner

Fig.5

| | RESOURCE ALLOCATION | RESTRICTIONS ON RESOURCE USE |
|---|---|---|
| MULTIPLEX-EXECUTION STATE IN MULTI-APPLICATION EXECUTION ENVIRONMENT (LIST DISPLAY) | • USER OPERATION: OCCUPIED BY WINDOW SYSTEM<br>• CPU RESOURCE: COOPERATIVE USE BY APPS<br>• WORK MEMORY RESOURCE: EVENLY DISTRIBUTED TO APPS<br>• TIME-SHARING COOPERATIVE HW RESOURCE (GPS, ETC)<br>  : TIME-SHARED COOPERATIVE USE BY APPS<br>• EXCLUSIVELY USED HW RESOURCE (IR, SOUND SYSTEM, ETC)<br>  : ALL APPS ARE PROHIBITED FROM USING | • RESTRICTED BY USER OPERATION PROHIBITION, POOR CPU RESOURCE, LOW MEMORY RESOURCE, LOW TIME-SHARING HW FREQUENCY<br>↓<br>• PERIODICALLY UPDATE MAP INFORMATION OF CURRENT POSITION AT LOW FREQUENCY (ABOUT ONCE A MINUTE) |
| SINGLE-EXECUTION STATE IN MULTI-APPLICATION EXECUTION ENVIRONMENT (INDIVIDUAL DISPLAY) | • USER OPERATION: ACQUIRE PART OF KEY EVENT<br>• CPU RESOURCE: OCCUPIED (OR USED BY PRIORITY) BY SELECTED APP<br>• WORK MEMORY RESOURCE: EVENLY DISTRIBUTED TO APPS<br>• TIME-SHARING COOPERATIVE HW RESOURCE (GPS, ETC)<br>  : OCCUPIABLE BY DISPLAY APP<br>• EXCLUSIVELY USED HW RESOURCE (IR, SOUND SYSTEM, ETC)<br>  : PART OF FUNCTIONS CAN BE USED BY DISPLAY APP ALONE | • USER OPERATION ALLOWED, CPU RESOURCE OCCUPIED (BY PRIORITY), GPS & IR HW EXCLUSIVELY USABLE<br>↓<br>• INCREASE FREQUENCY OF DRAWING UPDATE & ALLOW MAGNIFICATION TO CHANGE BY USER OPERATION<br>• FUNCTIONAL 3D DISPLAY, ETC CONSUMING LARGE MEMORY ARE PROHIBITED |
| SINGLE-APPLICATION EXECUTION ENVIRONMENT | • USER OPERATION: ACQUIRE PART OF KEY EVENT<br>• CPU RESOURCE: OCCUPIED BY SELECTED APP<br>• WORK MEMORY RESOURCE: OCCUPIED BY SELECTED APP<br>• TIME-SHARING COOPERATIVE HW RESOURCE (GPS, ETC)<br>  : OCCUPIED BY DISPLAY APP<br>• EXCLUSIVELY USED HW RESOURCE (IR, SOUND SYSTEM, ETC)<br>  : ALL FUNCTIONS ARE USABLE | • ALL OF MEMORY RESOURCE & EXCLUSIVE HW RESOURCE ARE USABLE<br>↓<br>• 3D DRAWING & SOUND ARE AVAILABLE |

MOBILE DEVICE AND APPLICATION SWITCHING METHOD

TECHNICAL FIELD

The present invention relates to a mobile device and application switching method in which a plurality of applications use a limited hardware resource.

BACKGROUND ART

It has recently been possible for small mobile information terminals such as cellular phones to download and execute applications. Examples of their execution environments include those executing only one application at a time and those starting and executing a plurality of applications as many as memories permit at the same time.

From the viewpoint of contents providers who provide services, however, phenomena such as drop in speed by half, shortage of memory, and occurrence of errors due to the lack of necessary hardware resources are more likely to occur in an environment in which a plurality of applications are executed at the same time than in the case where a single application is executed alone, since a single CPU or memory resource is shared by a plurality of applications against intentions of users and contents creators in the former.

Thus, in application platforms for providing services of contents providers, services cannot be provided stably when applications are executed in a multiplex manner. Therefore, in many cases, a single-execution environment in which only one application is run at a time has been employed or, even in a multiplex-execution state in which a plurality of applications can be started at the same time, only one application is executed while the other applications are stopped, so as to stabilize services.

Some cellular phone terminals (e.g., smartphones) which enable the multiplex-execution state, on the other hand, have been hard to provide with services in stable speed/operation environment, required their end users themselves to terminate applications which heavily consume CPU resources, and so forth, and thus are usable only by users with high literacy.

As a technique for executing a plurality of applications while efficiently switching among them on a limited resource, one disclosed in Patent Literature 1 has been proposed.

CITATION LIST

Patent Literature

Patent Literature 1: Japanese Patent Application Laid-Open No. 2006-146910

SUMMARY OF INVENTION

Technical Problem

However, the technique disclosed in Patent Literature 1 does not take account of the execution state and execution environment of applications mentioned above and thus fails to overcome the problem mentioned above.

It is therefore an object of the present invention to provide a mobile device and application switching method which can appropriately switch executions of applications from one to another when a plurality of applications use a limited resource.

Solution to Problem

A mobile device in accordance with the present invention is a mobile device for executing a plurality of applications, the mobile device comprising execution state shift means for shifting an execution state between a multiplex-execution state for executing a plurality of applications and a single-execution state for executing a single application in a multi-application execution environment adapted to execute a plurality of applications; execution state shift request receiving means for receiving a request for shifting the execution state from the multiplex-execution state to the single-execution state when a plurality of applications are being executed in the multiplex-execution state in the multi-application execution environment; application stop means for stopping, when the execution state shift request is received by the execution state shift request receiving means, an application other than the application to be executed in the single-execution state in the applications being executed in the multiplex-execution state; first resource release means for releasing a resource used by the applications being executed in the multiplex-execution state in response to the execution state shift request received by the execution state shift request receiving means; and first resource allocation means for allocating the resource released by the first resource release means to the application to be executed in the single-execution state.

An application switching method in accordance with the present invention is an application switching method for executing a plurality of applications, the method comprising an execution state shift step of shifting an execution state between a multiplex-execution state for executing a plurality of applications and a single-execution state for executing a single application in a multi-application execution environment adapted to execute a plurality of applications; an execution state shift request receiving step of receiving a request for shifting the execution state from the multiplex-execution state to the single-execution state when a plurality of applications are being executed in the multiplex-execution state in the multi-application execution environment; an application stop step of stopping, in response to the execution state shift request received in the execution state shift request receiving step, an application other than the application to be executed in the single-execution state in the applications being executed in the multiplex-execution state; a first resource release step of releasing a resource used by the applications being executed in the multiplex-execution state in response to the execution state shift request received in the execution state shift request receiving step; and a first resource allocation step of allocating the resource released in the first resource release step to the application to be executed in the single-execution state.

In the above-mentioned mobile device and application switching method in accordance with the present invention, in response to a request for shifting the execution state from the multiplex-execution state to the single-execution state, a resource used by the applications being executed in the multiplex-execution state is released, while an application other than the application to be executed in the single-execution state is stopped. Thereafter, the released resource is allocated to the application to be executed in the single-execution state, whereby the application to be executed in the single-execution state can use the resource without being restricted by the other applications. Thus, when a plurality of applications use a limited resource, the execution state can be shifted from the multiplex-execution state to the single-execution state even if the user does not carry out any operation for allocating the resource, whereby executions of applications can appropriately be switched from one to another.

Preferably, in this case, the first resource release means releases only the resource used by an application other than the application to be executed in the single-execution state in the plurality of applications being executed in the multiplex-execution state. In this mobile device, when shifting the execution state, only the resource used by an application other than the application to be executed in the single-execution state is released, while the resource being used by the application to be executed in the single-execution state is not released. This allows the application to be executed in the single-execution state to keep securing the resource even when the execution state shifts, whereby interrupts in the processing can be minimized.

A mobile device in accordance with the present invention is a mobile device for executing a plurality of applications, the mobile device comprising execution environment shift means for shifting an execution environment between a multi-application execution environment adapted to execute a plurality of applications and a single-application execution environment adapted to execute a single application alone; application termination means for terminating all the applications being executed in the multi-application execution environment in response to a request for shifting the execution environment; second resource release means for releasing a resource used by the applications being executed in the multi-application execution environment in response to a request for shifting the execution environment from the multi-application execution environment to the single-application execution environment; second resource allocation means for allocating the resource released by the second resource release means to the application to be executed in the single-application execution environment; and single-application execution means for executing the application to be executed in the single-application execution environment after the execution environment is shifted to the single-application execution environment by the execution environment shift means.

An application switching method in accordance with the present invention is an application switching method for executing a plurality of applications, the method comprising an execution environment shift step of shifting an execution environment between a multi-application execution environment adapted to execute a plurality of applications and a single-application execution environment adapted to execute a single application alone; an application termination step of terminating all the applications being executed in the multi-application execution environment in response to a request for shifting the execution environment; a second resource release step of releasing a resource used by the applications being executed in the multi-application execution environment in response to a request for shifting the execution environment from the multi-application execution environment to the single-application execution environment; a second resource allocation step of allocating the resource released in the second resource release step to the application to be executed in the single-application execution environment; and a single-application execution step of executing the application to be executed in the single-application execution environment after the execution environment is shifted to the single-application execution environment in the execution environment shift step.

In the above-mentioned mobile device and application switching method in accordance with the present invention, in response to a request for shifting the execution environment from the multi-application execution environment to the single-application execution environment in the multi-application execution environment, a resource used by the applications being executed in the multi-application execution environment is released, while all the applications being executed in the multi-application execution environment are terminated. Thereafter, the released resource is allocated to the application to be executed in the single-application execution environment, so as to execute this application. Therefore, the application to be executed in the single-application execution environment can use the resource without being restricted by the other applications. Thus, when a plurality of applications use a limited resource, the execution environment can be shifted from the multi-application execution environment to the single-application execution environment even if the user does not carry out any operation for allocating the resource, whereby executions of applications can appropriately be switched from one to another.

Preferably, in this case, the mobile device further comprises state information storage means for storing state information of a predetermined application being executed in the multi-application execution environment before terminating the applications being executed in the multi-application execution environment when the application to be executed in the single-application execution environment is to be started in association with the predetermined application, while the single-application execution means acquires the state information stored in the state information storage means and executes the application to be executed in the single-application execution environment. When the application to be executed in the single-application execution environment is to be started in association with a predetermined application being executed in the multi-application execution environment, this mobile device stores the state information of the latter application before terminating the applications being executed in the multi-application execution environment. Thereafter, the stored state information is acquired, so as to execute the application to be executed in the single-application execution environment. Therefore, by acquiring the stored state information, the application to be executed in the single-application execution environment can be associated with the application having been executed in the multi-application execution environment. This makes it possible to start the application to be executed in the multi-application execution environment and the application to be executed in the single-application execution environment in association with each other.

A mobile device in accordance with the present invention is a mobile device for executing a plurality of applications, the mobile device comprising execution state shift means for shifting an execution state between a multiplex-execution state for executing a plurality of applications and a single-execution state for executing a single application in a multi-application execution environment adapted to execute a plurality of applications; execution state shift request receiving means for receiving a request for shifting the execution state from the multiplex-execution state to the single-execution state when a plurality of applications are being executed in the multiplex-execution state in the multi-application execution environment; application stop means for stopping, when the execution state shift request is received by the execution state shift request receiving means, an application other than the application to be executed in the single-execution state in the applications being executed in the multiplex-execution state; first resource release means for releasing a resource used by the applications being executed in the multiplex-execution state in response to the execution state shift request received by the execution state shift request receiving means; first resource allocation means for allocating the resource released by the first resource release means to the application to be executed in the single-execution state; execution environment shift means for shifting an execution environment between the multi-application execution environment shifted to the single-execution state by the execution state shift means and a single-application execution environment adapted to execute a single application alone; application termination means for terminating all the applications being executed in the multi-application execution environment in response to a request for shifting the execution environment; second resource release means for releasing a resource used by the applications being executed in the multi-application execution environment in response to a request for shifting the execution environment from the multi-application execution environment to the single-application execution environment; second resource allocation means for allocating the resource released by the second resource release means to the application to be executed in the single-application execution environment; and single-application execution means for executing the application to be executed in the single-application execution environment after the execution environment is shifted to the single-application execution environment by the execution environment shift means.

An application switching method in accordance with the present invention is an application switching method for executing a plurality of applications, the application switching method comprising an execution state shift step of shifting an execution state between a multiplex-execution state for executing a plurality of applications and a single-execution state for executing a single application in a multi-application execution environment adapted to execute a plurality of applications; an execution state shift request receiving step of receiving a request for shifting the execution state from the multiplex-execution state to the single-execution state when a plurality of applications are being executed in the multiplex-execution state in the multi-application execution environment; an application stop step of stopping, in response to the execution state shift request received in the execution state shift request receiving step, an application other than the application to be executed in the single-execution state in the applications being executed in the multiplex-execution state; a first resource release step of releasing a resource used by the applications being executed in the multiplex-execution state in response to the execution state shift request received in the execution state shift request receiving step; a first resource allocation step of allocating the resource released in the first resource release step to the application to be executed in the single-execution state; an execution environment shift step of shifting an execution environment between the multi-application execution environment shifted to the single-execution state in the execution state shift step and a single-application execution environment adapted to execute a single application alone; an application termination step of terminating all the applications being executed in the multi-application execution environment in response to a request for shifting the execution environment; a second resource release step of releasing a resource used by the applications being executed in the multi-application execution environment in response to a request for shifting the execution environment from the multi-application execution environment to the single-application execution environment; a second resource allocation step of allocating the resource released in the second resource release step to the application to be executed in the single-application execution environment; and a single-application execution step of executing the application to be executed in the single-application execution environment after the execution environment is shifted to the single-application execution environment in the execution environment shift step.

In the above-mentioned mobile device and application switching method in accordance with the present invention, in response to the request for shifting the execution state from the multiplex-execution state to the single-execution state, a resource used by the applications being executed in the multiplex-execution state is released, while an application other than the application to be executed in the single-execution state is stopped. Subsequently, the released resource is allocated to the application to be executed in the single-execution state, whereby the application to be executed in the single-execution state can use the resource without being restricted by the other applications. Then, in response to the request for shifting the execution environment from the multi-application execution environment to the single-application execution environment in the multi-application execution environment shifted to the single-execution state, a resource used by the applications being executed in the multi-application execution environment is released, while all the applications being executed in the multi-application execution environment are terminated. Thereafter, the released resource is allocated to the application to be executed in the single-application execution environment, so as to execute this application. Therefore, the application to be executed in the single-application execution environment can use the resource without being restricted by the other applications. Thus, when a plurality of applications use a limited resource, the execution environment can be shifted from the multiplex-execution state to the single-execution state in the multi-application execution environment and further from the multi-application execution environment shifted to the single-execution state to the single-application execution environment even if the user does not carry out any operation for allocating the resource, whereby executions of applications accompanying the shifts of execution states and execution environments can appropriately be switched from one to another.

Advantageous Effects of Invention

The present invention makes it possible to switch executions of applications appropriately from one to another when a plurality of applications use a limited resource.

BRIEF DESCRIPTION OF DRAWINGS

FIG. 5 is a chart illustrating allocations of resources for applications executed in the execution environments and restrictions on their use;

DESCRIPTION OF EMBODIMENTS

Figure 1:
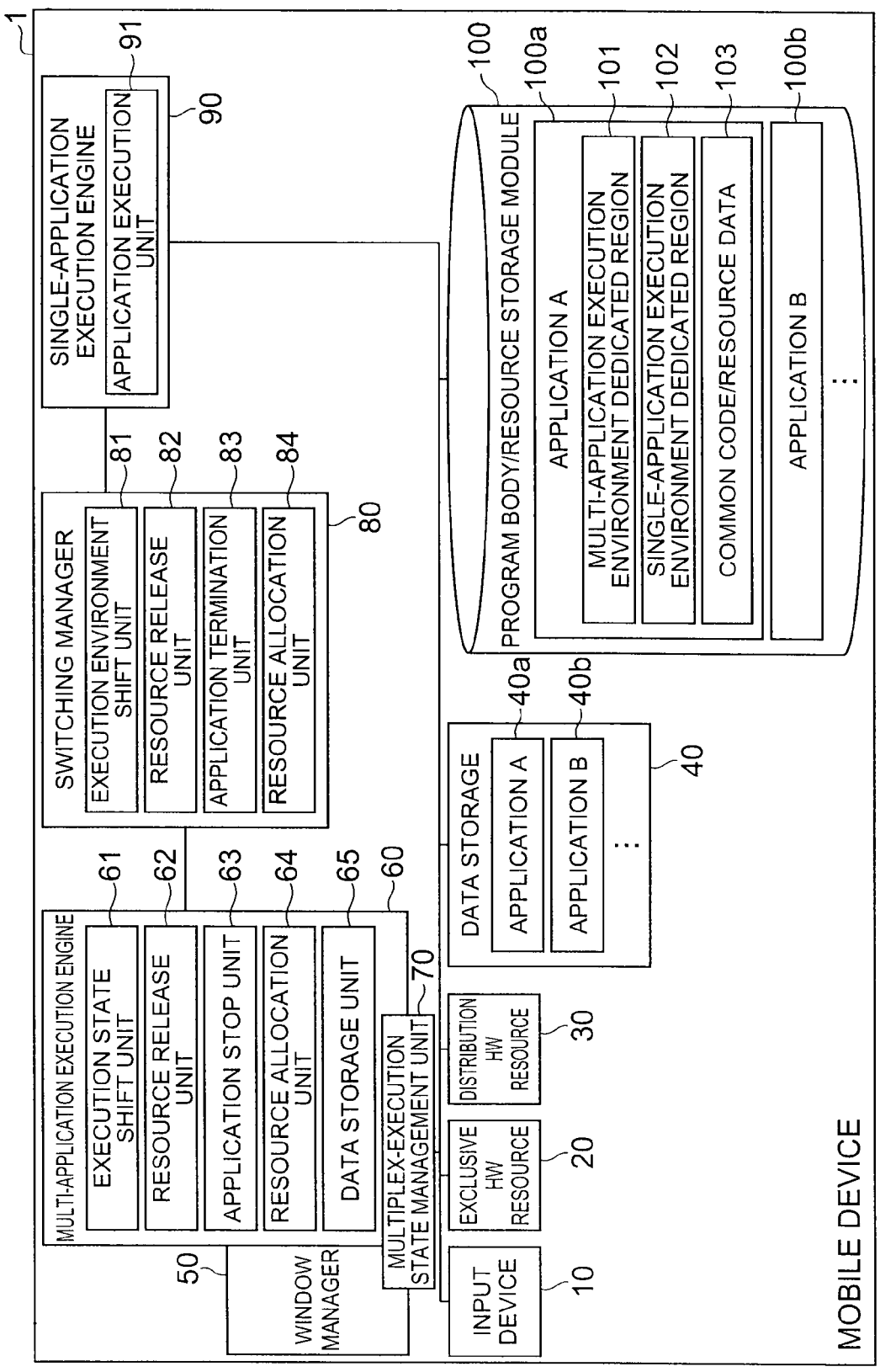
FIG. 1 is a functional structural diagram illustrating functions of the mobile device in accordance with an embodiment.

In the following, embodiments of the mobile device and application switching method in accordance with the present invention will be explained in detail with reference to the drawings. In the drawings, the same constituents will be referred to with the same signs while omitting their overlapping descriptions.

Figure 2:
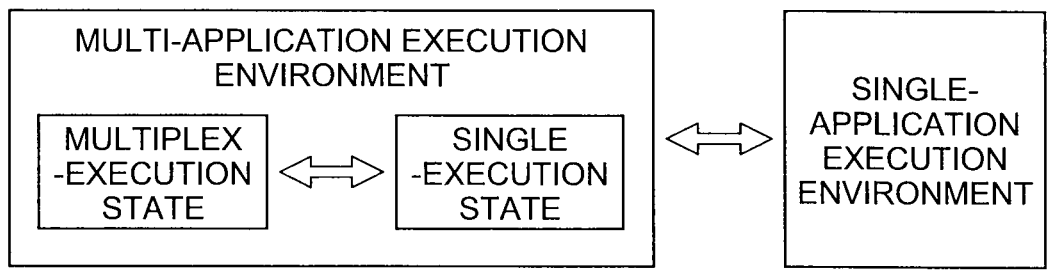
FIG. 2 is a transition diagram of application execution environments in the mobile device.

FIG. 1 is a functional structural diagram illustrating functions of the mobile device in accordance with an embodiment, while FIG. 2 is a transition diagram of application execution environments in the mobile device.

As illustrated in FIG. 1, the mobile device 1 in accordance with this embodiment is a small-sized mobile communication terminal, an example of which is a cellular phone, whose resource is limited as compared with personal computers and the like. The mobile device 1 is built-in with a plurality of applications for providing services and the like for its user, while the plurality of applications are executed simultaneously or singly by using the limited resource.

As illustrated in FIG. 2, the mobile device 1 is provided with a multi-application execution environment (multiplex-execution environment) adapted to execute a plurality of applications and a single-application execution environment (single-execution environment) adapted to execute a single application alone, while the multi-application execution environment is further provided with a multiplex-execution state in which a plurality of applications are executed and a single-execution state in which a single application is executed. That is, the multi-application execution environment is an environment in which applications of a multi-application execution mode can be executed, the multiplex-execution state is a state where a resource is distributed to a plurality of applications under a predetermined condition, and the single-execution state is a state where the resource is allocated to a single application under a predetermined condition. On the other hand, the single-application execution environment is an environment in which an application of a single-application execution mode can be executed alone. The applications built-in with the mobile device 1 are executed in the above-mentioned execution environments and execution states. The applications built-in with the mobile device 1 include those in which an application (program) of the multi-application execution mode and an application (program) of the single-application execution mode are constructed into the same application package, while the application of the multi-application execution mode and the application of the single-application execution mode are started in association with each other.

Also, as illustrated in FIG. 1, the mobile device 1 is provided with an input device 10, an exclusive hardware resource 20, a distribution hardware resource 30, a data storage 40, a window manager 50, a multi-application execution engine 60, a single-application execution engine 90, a switching manager 80, and a program body/resource storage module 100.

The input device 10, which is an input device for controlling the applications and the window manager 50 by user operations, corresponds to various keys and the like in the mobile device 1.

The exclusive hardware resource 20 is a hardware resource usable by a single application alone, examples of which include infrared communication devices and voice synthesis functions.

The distribution hardware resource 30 is a hardware resource usable by a plurality of applications in a distributed manner by sharing time or quantity, examples of which include a main memory and CPU.

The data storage 40 is a storage device into which applications can write their own data. The data storage 40 secures dedicated areas 40a, 40b, . . . for the respective applications.

The window manager 50 is a control unit for controlling displays of the applications. The window manager 50 displays the applications by their respective sizes of windows according to various display modes. When a plurality of applications are executed in the multiplex-execution state in the multi-application execution environment, the window manager 50 shows a list of the respective windows of applications in a superposing manner on the display. When a single application is executed in the single-execution state in the multi-application execution environment, on the other hand, the application is individually shown on the display. In the single-application execution environment, since a single application runs alone, this application is largely shown on the display. Therefore, the single-application execution environment is displayable without the aid of a module such as the window manager 50 which manages a plurality of screen information items.

The multi-application execution engine 60 provides the multi-application execution environment and executes one or a plurality of applications in the multi-application execution mode. That is, the multi-application execution engine 60 distributes a resource to one or a plurality of applications, so as to execute a plurality of applications in the multiplex-execution state and a single application in the single-execution state. The multi-application execution engine 60 shifts the execution state between the multiplex-execution state and the single-execution state. Therefore, the multi-application execution engine 60 is provided with respective functions of an execution state shift unit 61, a resource release unit 62, an application stop unit 63, a resource allocation unit 64, and a data storage unit 65.

The execution state shift unit 61 shifts the execution state between the multiplex-execution state and the single-execution state in the multi-application execution environment. For example, upon receiving an execution state shift request by a key event of the input device 10 operated by the user for executing a predetermined application singly when a plurality of applications are being executed in the multiplex-execution state, the execution state shift unit 61 terminates the multiplex-execution state and shifts the execution state to the single-execution state. Here, each application cannot issue a request for shifting the execution state from the multiplex-execution state to the single-execution state. The state shift must be done passively as instructed by the user or the window system. This prevents resource competition from occurring in a mode in which a plurality of applications run simultaneously.

The resource release unit 62 releases the resource used by applications which are currently being executed. That is, upon receiving the request for shifting the execution state from the multiplex-execution state to the single-execution state in the multi-application execution environment, the resource release unit 62 causes the applications other than the application to be executed in the single-execution state among the applications currently being executed in the multiplex-execution state to release the distribution hardware resource 30 in use other than the memory resource. In the multiplex-execution state, since the applications cannot use the exclusive hardware resource 20 as will be explained later, only the distribution hardware resource 30 is released by the resource release unit 62. When the execution state is shifted from the multiplex-execution state to the single-execution state, all the applications other than the application to be executed in the single-execution state are stopped as will be explained later, whereby the memory resource in use by these applications is not to be released.

Upon receiving the request for shifting the execution state from the multiplex-execution state to the single-execution state in the multi-application execution environment, the application stop unit 63 stops the applications other than the application to be executed in the single-execution state. In the present invention, "stop" means a state where no allocation of the CPU resource is provided (the CPU time for using the CPU resource is not allocated) while the memory resource for execution is secured. Therefore, while the execution is stopped, the CPU time is allocated when the execution state shifts from the single-execution state to the multiplex-execution state, whereby the operation resumes.

When the execution state is shifted from the multiplex-execution state to the single-execution state by the execution state shift unit 61, the resource allocation unit 64 allocates the distribution hardware resource 30 released by the resource release unit 62 and, if necessary, the exclusive hardware resource 20 to the application to be executed in the single-execution state.

The data storage unit 65 stores state information of the application being executed when shifting the execution environment in order to make it possible for the application of the multi-application execution mode and the application of the single-application execution mode to be started in association with each other. The state information is constituted by state information common in the applications to be started in association with each other and unique state information used between the applications to be started in association with each other.

A multiplex-execution state management unit 70 intermediately controls the multi-application execution engine 60 and the window manager 50, so as to switch the display state between those corresponding to the multiplex-execution state and the single-execution state. The multiplex-execution state management unit 70 also receives a key event generated during when the execution state shifts to the multiplex-execution state. Then, the multiplex-execution state management unit 70 determines the application being executed or window manager 50 to which the key event is to be delivered and delivers the key event thereto. When the user operation is an operation for switching between the multiplex-execution state and the single-execution state for the window manager 50, the execution state is switched as appropriate. The state shift between the multiplex-execution state and the single-execution state is prohibited for the applications but is only possible by a user operation or a request for an operation from the system. Once shifted to the single-execution state, on the other hand, there are no applications operating in competition with each other, so that the execution engines can be switched therebetween at a given timing from the applications.

The switching manager 80 shifts the execution environment between the multi-application execution environment and the single-application execution environment. An example of the cases where the execution environment shifts is a case where, while an application of the multi-application execution mode is being executed in the single-execution state in multi-application execution environment, an application of the single-application execution mode to be started in association with the application of the multi-application execution mode is executed in the single-application execution environment. Upon receiving the execution state shift request by a switching request from the application, the switching manager 80 shifts the execution environment from the multi-application execution environment to the single-application execution environment. Therefore, the switching manager 80 is provided with functions of an execution environment shift unit 81, a resource release unit 82, an application termination unit 83, and a resource allocation unit 84.

The execution environment shift unit 81 shifts the execution environment from the multi-application execution environment to the single-application execution environment. For example, while an application of the multi-application execution mode is being executed in the multi-application execution environment in the single-execution state, when the user operates the input device 10 in order to execute an application of the single-application execution mode to be started in association with the application in the multi-application execution mode, an execution state shift request is sent by this key event. Upon receiving the execution state shift request, the execution environment shift unit 81 shifts the execution environment from the multi-application execution environment to the single-application execution environment.

The resource release unit 82 releases a resource used by the applications currently being executed in the multi-application execution environment. That is, upon receiving the request for shifting the execution environment from the multi-application execution environment to the single-application execution environment, the resource release unit 82 causes the applications to release the exclusive hardware resource 20 and distribution hardware resource 30 in use.

Upon receiving the request for shifting the execution state from the multi-application execution environment to the single-application execution environment, the application termination unit 83 forcibly terminates all the applications being executed in the multi-application execution environment.

When the execution environment is shifted from the multi-application execution environment to the single-application execution environment by the execution environment shift unit 81, the resource allocation unit 84 allocates the exclusive hardware resource 20 and distribution hardware resource 30 released by the resource release unit 82 to the application to be executed in the single-application execution environment.

The single-application execution engine 90 provides the single-application execution environment and executes the application of the single-application execution mode. When the execution environment is shifted from the multi-application execution environment to the single-application execution environment by the switching manager 80, the single-application execution engine 90 appropriately executes the application of the single-application execution mode. Therefore, the single-application execution engine 90 is provided with a function of an application execution unit 91.

When the execution environment is shifted from the multi-application execution environment to the single-application execution environment by the execution environment shift unit 81 in the switching manager 80, the application execution unit 91 executes the application of the single-application execution mode. Here, when the application of the single-application execution mode to be executed is an application to be started in association with an application of the single-application execution mode, they are started in association with each other.

The program body/resource storage module 100 is a storage device for storing program bodies of applications adapted to run in the multi-application execution environment and single-application execution environment and resource data such as images and sounds which are usable by these applications but not rewritable. The program body/resource storage module 100 secures dedicated areas 100a, 100b, . . . for the respective applications, while each dedicated area is provided with a multi-application execution environment dedicated region 101, a single-application execution environment dedicated region 102, and common code/resource data 103.

Figure 3:
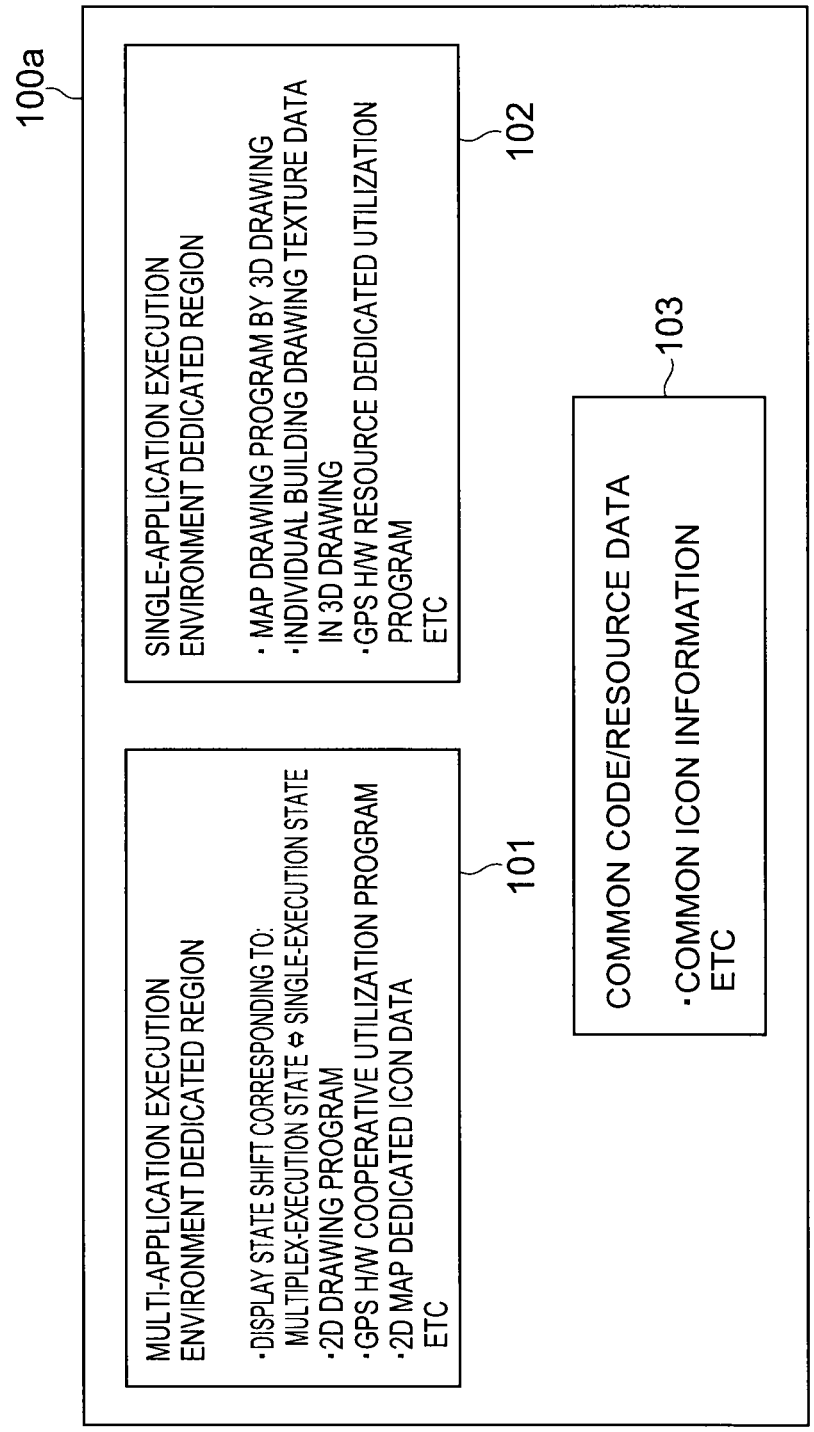
FIG. 3 is a chart illustrating a structural example of each dedicated area in a program body/resource storage module.

FIG. 3 is a chart illustrating the structure of the dedicated area 100a for a map application as an example of dedicated areas in the program body/resource storage module. In FIG. 3, the map display application stored in the dedicated area 100a is a package which includes applications of the multi-application execution mode and single-application execution mode. The applications of the multi-application execution mode and single-application execution mode are those to be started in association with each other while using the same state information.

The multi-application execution environment dedicated region 101 stores various kinds of information to be used by the map display application of the multi-application execution mode, examples of which include a display state shift program corresponding to the multiplex-execution state and single-execution state, a 2D (two-dimensional) drawing program, a GPS hardware resource cooperative utilization program, and 2D map dedicated icon data.

The single-application execution environment dedicated region 102 stores various kinds of information to be used by the map display application of the single-application execution mode, examples of which include a map drawing program by 3D (three-dimensional) drawing, individual building drawing texture data in 3D drawing, and a GPS hardware resource dedicated utilization program.

The common code/resource data 103 stores various kinds of information to be used in common by the map display applications of the multi-application execution mode and single-application execution mode, an example of which is common icon information.

Figure 4:
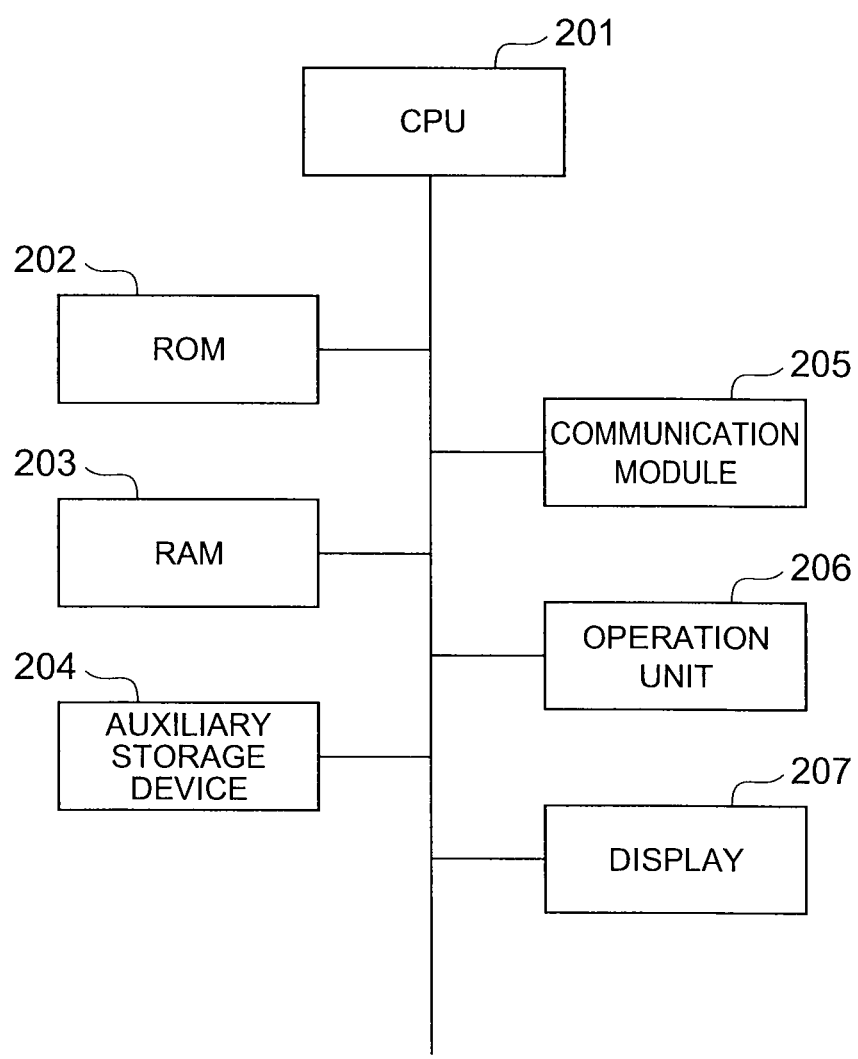
FIG. 4 is a diagram illustrating the hardware structure of the mobile device.

FIG. 4 is a diagram illustrating the hardware structure of the mobile device. As illustrated in FIG. 4, the mobile device 1 physically comprises a CPU 201, a ROM 202, a RAM 203, an auxiliary storage device 204, a communication module 205, an operation unit 206, and a display 207. The various functions explained with reference to FIG. 1 are achieved by causing the CPU 201 and RAM 203 illustrated in FIG. 4 to read predetermined computer software thereonto, so as to operate the communication module 205 under the control of the CPU 201 and read and write data in the RAM 203 and auxiliary storage device 204.

FIG. 5 is a chart illustrating allocations of resources for applications executed in the execution environments and restrictions on their use. FIG. 5 illustrates an example of the resource allocation and restrictions on the resource utilization in the multiplex-execution state of the multi-application execution environment (list display), the single-execution state of the multi-application execution environment (individual display), and the single-application execution environment. In the multiplex-execution state in the multi-application execution environment, as illustrated in FIG. 5, each application to be executed can use the distributed hardware resource 30 in a limited manner but cannot use the exclusive hardware resource 20. In the single-execution state in the multi-application execution environment, each application to be executed can use the distributed hardware resource 30 and exclusive hardware resource 20 in a limited manner. In the single-application execution environment, the application can use all of the distributed hardware resource 30 and exclusive hardware resource 20 without limitation.

Figure 6:
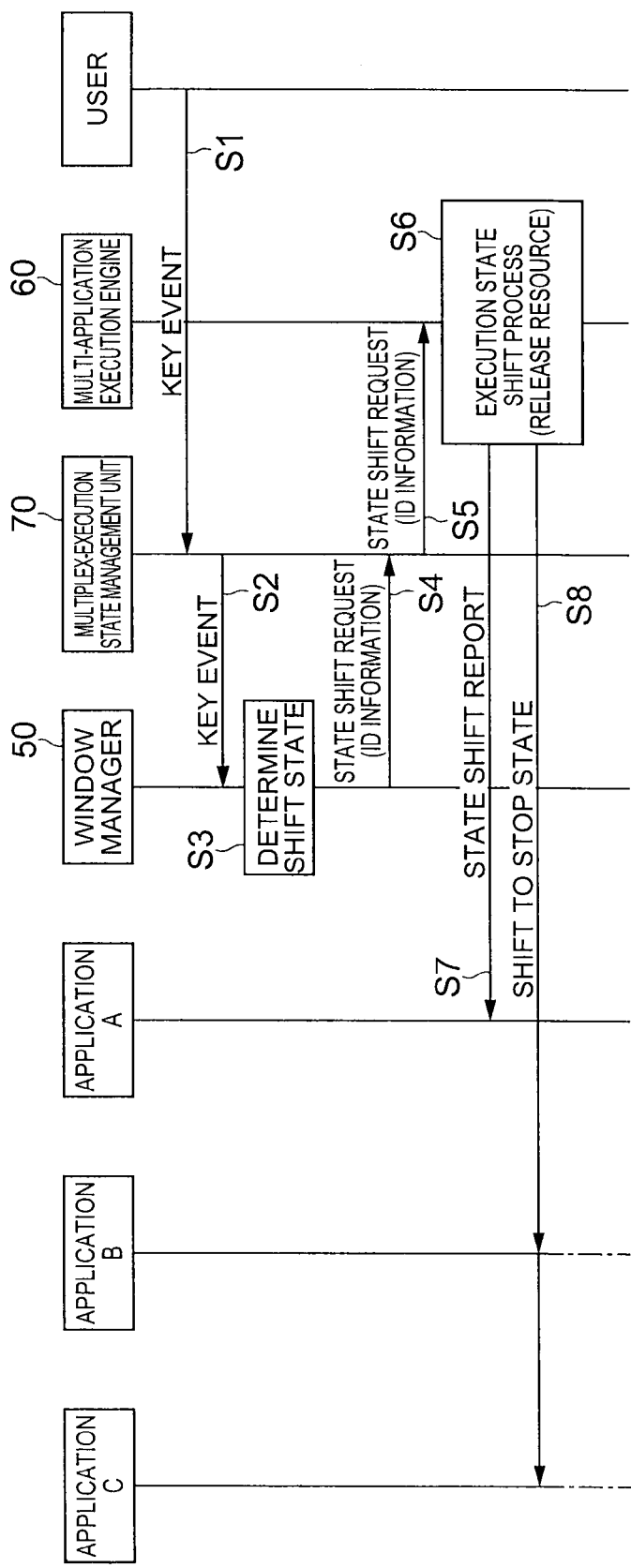
FIG. 6 is a sequence chart for explaining a processing operation for shifting the execution state from a multiplex-execution state to a single-execution state in a multi-application execution environment.
Figure 7:
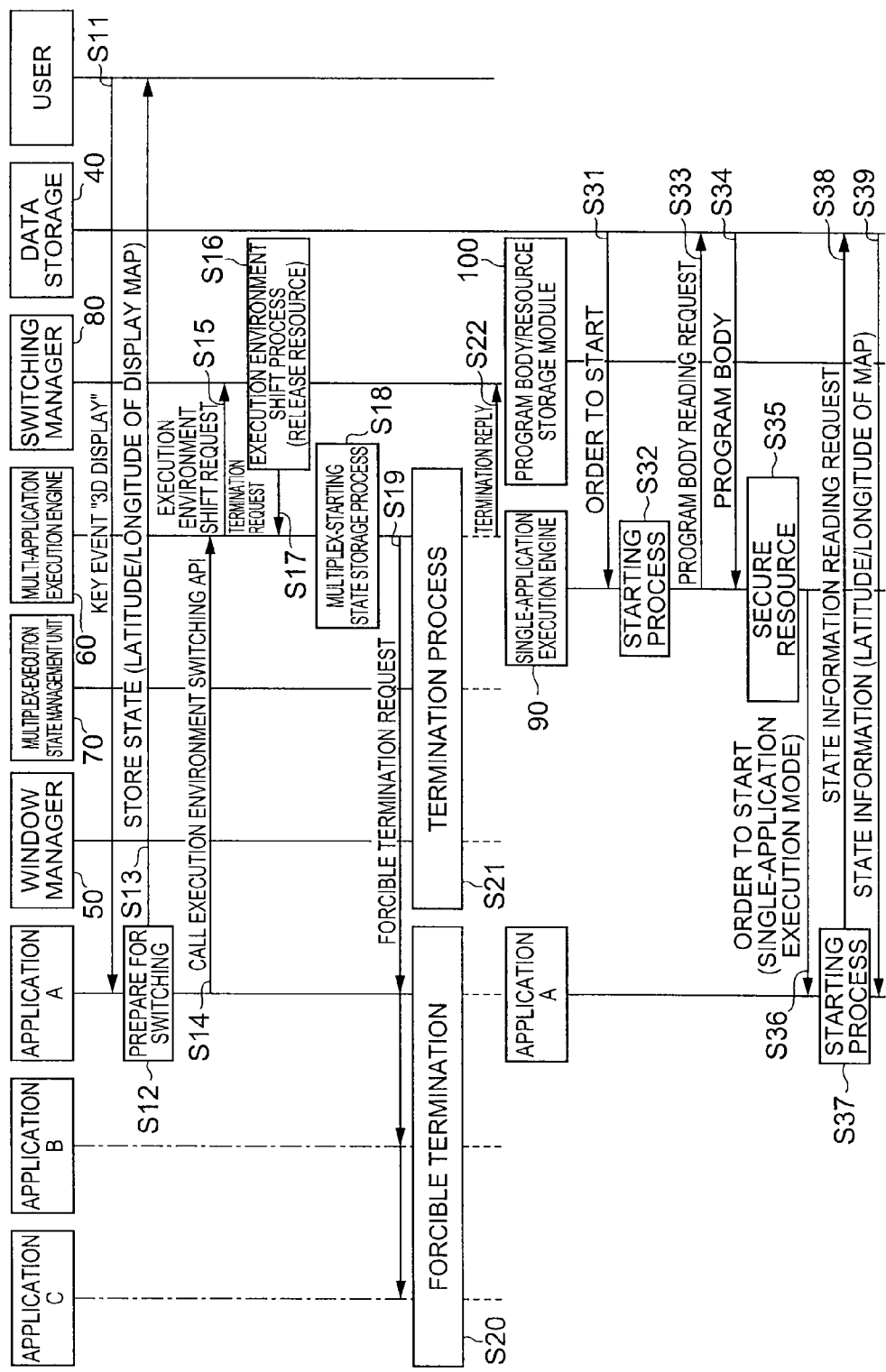
FIG. 7 is a sequence chart for explaining a processing operation for shifting the execution environment from the multi-application execution environment in the single-execution state to a single-application execution environment.
Figure 8:
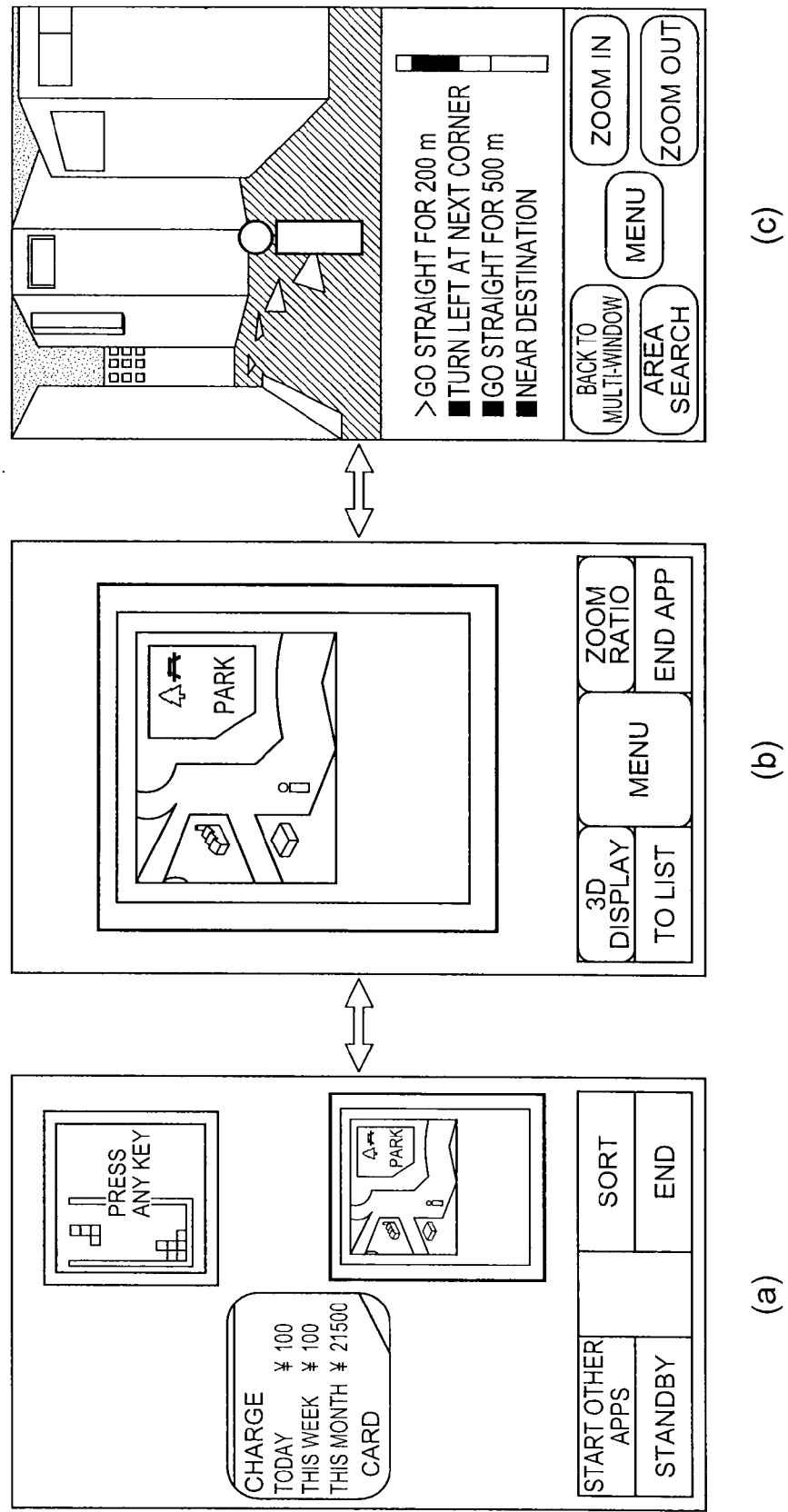
FIG. 8 is a view illustrating display examples.

Processing operations of the mobile device 1 in accordance with this embodiment will now be explained with reference to FIGS. 6 to 8. FIG. 6 is a sequence chart for explaining a processing operation for shifting the execution state from the multiplex-execution state to the single-execution state in the multi-application execution environment, FIG. 7 is a sequence chart for explaining a processing operation for shifting the execution environment from the multi-application execution environment in the single-execution state to the single-application execution environment, and FIG. 8 is a view illustrating display examples.

First, with reference to FIG. 6, a processing operation for shifting the execution state from the multiplex-execution state to the single-execution state in the multi-application execution environment will be explained.

This processing operation will be explained from a state where an application A which is the map display package application illustrated in FIG. 3 and other applications B and C are being executed in the multiplex-execution state in the multi-application execution environment. The display state at this time is illustrated in FIG. 8(a), in which the applications A to C are shown as a list with their respective small windows.

When the application A is selected by a key operation from the user in this state, the key event of the user is reported to the multiplex-execution state management unit 70 (step S1).

Upon receiving the key event, the multiplex-execution state management unit 70 determines, from the combination of the current display state and the type of the key event, that the window manager 50 is where the key event is to be delivered, and delivers the key event to the window manager 50 (step S2).

Subsequently, the window manager 50 determines, from the received key event and the current display state, that the key event is an event that the execution state shifts from the multiplex-execution state (list display) to the single-execution state (individual display) (step S3). Then, using the ID information of the application A selected by the user, the window manager 50 reports an execution state shift request to the multiplex-execution state management unit 70 (step S4).

Upon receiving the report of the execution state shift request, the multiplex-execution state management unit 70 reports the execution state shift request including the ID information to the multi-application execution engine 60 (step S5).

Upon receiving the report of the execution state shift request, the multi-application execution engine 60 carries out execution state shift processing for shifting the execution state from the multiplex-execution state to the single-execution state in the multi-application execution environment (step S6). The execution state shift processing initially releases the resource being used by the applications B and C other than the application A selected by the user, so as to shift the applications B and C to a stop state. Then, thus released resource is allocated to the application A. The multi-application execution engine 60 also sends an execution state shift report indicating that the execution state has shifted from the multiplex-execution state to the single-execution state to the application A (step S6) and a stop state shift report indicating that the state has shifted to the stop state to the applications B and C (step S7).

As a consequence, in the mobile device 1, the execution state is shifted from the multiplex-execution state to the single-execution state in the multi-application execution environment, so as to attain the single-execution state of the application A, whereby the application A is individually shown by a large window on the display as illustrated in FIG. 8(b).

Next, a processing operation for shifting the execution state from the multi-application execution environment in the single-execution state to the single-application execution environment will be explained with reference to FIG. 7.

In the initial state of this processing operation, the application A, which is the map display package application illustrated in FIG. 3, is being executed in the single-execution state in the multi-application execution environment on the mobile device 1. At this time, the application A is individually shown by a large window on the display as illustrated in FIG. 8(b).

When "3D display" corresponding to the application A for executing the single application is selected by a key operation from the user, the key event of the user is reported to the application A (step S11).

Upon receiving the key event, the application A can determine that the user requests for a 3D display, and thus prepares for switching to an application of the single-application execution mode (step S12). The preparation for switching stores the state information of applications of the multi-application execution mode into the dedicated area 40a of the data storage 40 (step S13). The state information is stored when the multi-application execution engine 60 executes the application A. The state information stored in the dedicated area 40a of the data storage 40 is information used in common by the application A of the multi-application execution mode being executed in the multi-application execution environment and an application of the single-application execution mode to be executed after the execution environment shifts, an example of which is "latitude/longitude information of the currently displayed map" which is user information.

Upon storing the state information into the data storage 40, the application A calls an "execution state switching API" provided by the multi-application execution engine 60 (step S14).

When the "execution state switching API" is called, the multi-application execution engine 60 sends an execution environment shift request for shifting the execution environment from the multi-application execution environment to the single-application execution environment to the switching manager 80 (step S15).

Upon receiving the execution environment shift request, the switching manager 80 carries out execution environment shift processing (step S16). First, the execution environment shift processing releases the resource used by the application A of the multi-application execution mode being executed in the multi-application execution environment. Here, resources allocated to other applications (e.g., stopped applications) in the multi-application execution mode, if any, are also released. Then, for forcibly terminating all the applications, a termination request is issued to the multi-application execution engine 60 (step S17).

Upon receiving the termination request, the multi-application execution engine 60 stores information necessary for executing the application A, such as the type of the application A currently being executed, into a memory (step S18). Then, the multi-application execution engine 60 sends a forcible termination request to the application A being executed in the multi-application execution environment and all of the stopped applications B and C so as to terminate them forcibly (step S19).

Upon receiving the forcible termination request, the applications A to C are forcibly terminated regardless of whether they are currently executed or stopped (step S20). Then, in association with the window manager 50, the multi-application execution engine 60 and the multiplex-execution state management unit 70 terminate display processing such as drawing (step S21).

Subsequently, the multi-application execution engine 60 reports a termination reply indicating that the multi-application execution environment has ended to the switching manager 80 (step S22).

Designating the application A, the switching manager 80 sends a starting instruction for starting the application A of the single-application execution mode to the single-application execution engine 90 (step S31). Here, the application A is designated by the ID number of the application.

Upon receiving the starting instruction, the single-application execution engine 90 carries out processing for starting the application A of the single-application execution mode (step S32). The starting processing retrieves the dedicated area 100a corresponding to the application A from the program body/resource module 100 according to the ID information designated by the starting instruction, and reads the program body of the application A of the single-application execution mode from the single-application execution environment dedicated region 102 of the dedicated area 100a (steps S33 and S34).

Then, the single-application execution engine 90 secures all the resources such as the exclusive hardware resource 20 and distribution hardware resource 30 such that they are usable by the application A of the single-application execution mode (step S35). Subsequently, the single-application execution engine 90 sends the starting instruction to the application A of the single-application execution mode (step S36).

The application A having received the starting instruction carries out processing for starting the program body read from the program body/resource storage module 100 (step S37). The program body starting processing also sends a state information reading request for reading the state information stored by the application A in the multi-application execution mode to the data storage 40 (step S38). Then, the data storage 40 reads the requested state information and sends it to the application A of the single-application execution mode (step S39). Subsequently, the application A of the single-application execution mode starts the program body by using this state information.

The execution environment is thus shifted from the multi-application execution environment to the single-application execution environment, and the application A of the single-application execution mode is started, whereby the application A is shown on the whole display as illustrated in FIG. 8(c).

Thus, upon receiving the request for shifting the execution state from the multiplex-execution state to the single-execution state in the multi-application execution environment, this embodiment releases the resource used by the applications being executed in the multiplex-execution state and stops the applications other than the application to be executed in the single-execution state. Thereafter, the released resource is allocated to the application to be executed in the single-execution state, whereby the application to be executed in the single-execution state can use the resource without being restricted by the other applications. Thus, when a plurality of applications use a limited resource, the execution state can be shifted from the multiplex-execution state to the single-execution state even if the user does not carry out any operation for allocating the resource, whereby executions of applications can appropriately be switched from one to another.

When shifting the execution state, only the resource being used by the applications B and C other than the application A to be executed in the single-execution state is released, while the resource used by the application A to be executed in the single-execution state is not released. Therefore, the application A to be executed in the single-execution state can keep securing the resource even when the execution state shifts and thus can minimize interrupts in the processing.

Upon receiving the request for shifting the multi-application execution environment to the single-application execution environment in the multi-application execution environment, the resource used by the applications being executed in the multi-application execution environment is released, while all the applications being executed in the multi-application execution environment are terminated. Thereafter, the released resource is allocated to the application to be executed in the single-application execution environment, so as to execute this application. Therefore, the application to be executed in the single-application execution environment can use the resource without being restricted by the other applications. Thus, when a plurality of applications use a limited resource, the execution environment can be shifted from the multi-application execution environment to the single-application execution environment even if the user does not carry out any operation for allocating the resource, whereby executions of applications can appropriately be switched from one to another.

When an application of the single-application execution mode is to be started in association with an application of the multi-application execution mode, the state information of the application to be started in association with the former application is stored before terminating the applications of the multi-application execution mode being executed in the multi-application execution environment. Thereafter, while acquiring the stored information, the application of the single-application execution mode to be executed in the single-application execution environment is executed, whereby the application of the single-application execution mode can associate with the application of the multi-application execution mode by acquiring the stored state information. This makes it possible to start the application of the multi-application execution mode and the application of the single-application execution mode in association with each other.

Even when the user does not carry out any operation for allocating the resource, the execution state can be shifted from the multiplex-execution state to the single-execution state in the multi-application execution environment, and the execution environment can be shifted from the multi-application execution environment shifted to the single-execution state to the single-application execution environment, whereby the executions of applications accompanying the shifts of execution states and execution environments can appropriately be switched from one to another.

The present invention has been explained specifically with reference to its embodiment in the foregoing but is not limited thereto. For example, while the application A of the single-application execution mode stores its own state information into the data storage 40 when shifting the execution environment from the multi-application execution environment to the single-application execution environment in the above-mentioned embodiment, the state information may be stored by any of the switching manager 80, the multi-application execution engine 60, the single-application execution engine 90, and the like as well as other separate functions.

Though the above-mentioned embodiment has been explained by using a map display application as an example of applications in which an application of the multi-application execution mode and an application of the single-application execution mode are started in association with each other, any application is employable as long as it is one in which an application of the multi-application execution mode and an application of the single-application execution mode can be started in association with each other.

Though the above-mentioned embodiment has been explained by using the latitude/longitude information of the current position as an example of the state information to be stored in the data storage 40, any information is employable as long as it can be utilized in common by an application of the multi-application execution mode and an application of the single-application execution mode. In the case of a game application, for example, it may be information of high scores, an allocation table for key operations and functions, or the like.

REFERENCE SIGNS LIST

1 . . . mobile device; 10 . . . input device; 20 . . . exclusive hardware resource; 30 . . . distribution hardware resource; 40 . . . data storage; 40a, 40b . . . dedicated area; 50 . . . window manager; 60 . . . multi-application execution engine; 61 . . . execution state shift unit; 62 . . . resource release unit (first resource release means); 63 . . . application stop unit; 64 . . . resource allocation unit (first resource allocation means); 65 . . . data storage unit; 70 . . . multiplex-execution state management unit (execution state shift request receiving unit); 80 . . . switching manager; 81 . . . execution environment shift unit; 82 . . . resource release unit (second resource release means); 83 . . . application termination unit; 84 . . . resource allocation unit (second resource allocation means); 90 . . . single-application execution engine; 91 . . . application execution unit; 100 . . . program body/resource storage module; 100a, 100b . . . dedicated area; 101 . . . multi-application execution environment dedicated region; 102 . . . single-application execution environment dedicated region; 103 . . . common code/resource data

The invention claimed is:

1. A mobile device for executing a plurality of applications, the mobile device comprising:
    circuitry configured to
        shift an execution state between a multiplex-execution state for executing a plurality of applications and a single-execution state for executing a single application in a multi-application execution environment configured to execute a plurality of applications;
        receive a request for shifting the execution state from the multiplex-execution state to the single-execution state when a plurality of applications are being executed in the multiplex-execution state in the multi-application execution environment;
        forcibly stop, when the execution state shift request is received, an application other than the application to be executed in the single-execution state in the applications being executed in the multiplex-execution state;
        release a resource used by the applications being executed in the multiplex-execution state in response to the received execution state shift request; and
        allocate the resource released to the application to be executed in the single-execution state.

2. The mobile device according to claim 1, wherein the circuitry is configured to release only the resource used by an application other than the application to be executed in the single-execution state in the plurality of applications being executed in the multiplex-execution state.

3. The mobile device according to claim 1, wherein the circuitry is configured to:
    control displaying, in the multiplex-execution state, a list of the plurality of applications executed in the multiplex-execution state; and
    control individually displaying, in the single-execution state, the single application executed in the single-execution state.

4. The mobile device according to claim 1, wherein
the resource comprises a distribution resource usable by a plurality of applications, and
the circuitry is configured to
release the distribution resource used by the applications being executed in the multiplex-execution state; and
allocate the distribution resource to the application to be executed in the single-execution state.

5. A mobile device for executing a plurality of applications, the mobile device comprising:
circuitry configured to
shift an execution environment between a multi-application execution environment configured to execute a plurality of applications and a single-application execution environment configured to execute a single application alone;
forcibly terminate all the applications being executed in the multi-application execution environment in response to a request for shifting the execution environment;
release a resource used by the applications being executed in the multi-application execution environment in response to a request for shifting the execution environment from the multi-application execution environment to the single-application execution environment;
allocate the resource released to the application to be executed in the single-application execution environment; and
execute the application to be executed in the single-application execution environment after the execution environment is shifted to the single-application execution environment.

6. The mobile device according to claim 5, wherein the circuitry is configured to:
store state information of a predetermined application being executed in the multi-application execution environment before forcibly terminating the applications being executed in the multi-application execution environment when the application to be executed in the single-application execution environment is to be started in association with the predetermined application;
acquire the stored state information; and
execute the application to be executed in the single-application execution environment.

7. The mobile device according to claim 5, wherein
the circuitry is configured to forcibly terminate all the applications being executed in the multi-application execution environment in response to the request for shifting the execution environment to the single-application execution environment in the multi-application execution environment in a single-execution state for executing a single application and individually showing the single application.

8. The mobile device according to claim 5, wherein
the resource comprises an exclusive resource usable by a single application alone and a distribution resource usable by a plurality of applications, and
the circuitry is configured to
release the distribution resource and the exclusive resource used by the applications being executed in the multi-application execution environment in the single-execution state; and
allocate the distribution resource and the exclusive resource to the application to be executed in the single-execution state.

9. A mobile device for executing a plurality of applications, the mobile device comprising:
circuitry configured to
shift an execution state between a multiplex-execution state for executing a plurality of applications and a single-execution state for executing a single application in a multi-application execution environment configured to execute a plurality of applications;
receive a request for shifting the execution state from the multiplex-execution state to the single-execution state when a plurality of applications are being executed in the multiplex-execution state in the multi-application execution environment;
forcibly stop, when the execution state shift request is received, an application other than the application to be executed in the single-execution state in the applications being executed in the multiplex-execution state;
release a resource used by the applications being executed in the multiplex-execution state in response to the execution state shift request;
allocate the resource released to the application to be executed in the single-execution state;
shift an execution environment between the multi-application execution environment shifted to the single-execution state and a single-application execution environment configured to execute a single application alone;
forcibly terminate all the applications being executed in the multi-application execution environment in response to a request for shifting the execution environment;
release a resource used by the applications being executed in the multi-application execution environment in response to a request for shifting the execution environment from the multi-application execution environment to the single-application execution environment;
allocate the resource released to the application to be executed in the single-application execution environment; and
execute the application to be executed in the single-application execution environment after the execution environment is shifted to the single-application execution environment.

10. The mobile device according to claim 9, wherein the circuitry is configured to:
control displaying, in the multiplex-execution state, a list of the plurality of applications executed in the multiplex-execution state; and
control individually displaying, in the single-execution state, the single application executed in the single-execution state.

11. The mobile device according to claim 9, wherein
the resource comprises an exclusive resource usable by a single application alone and a distribution resource usable by a plurality of applications, and
the circuitry is configured to
release the distribution resource used by the applications being executed in the multiplex-execution state;
allocate the distribution resource to the application to be executed in the single-execution state;
release the distribution resource and the exclusive resource used by the applications being executed in the multi-application execution environment in the single-execution state; and allocate the distribution resource and the exclusive resource to the application to be executed in the single-execution state.

12. An application switching method for executing a plurality of applications, the method comprising:
   an execution state shift step of shifting an execution state between a multiplex-execution state for executing a plurality of applications and a single-execution state for executing a single application in a multi-application execution environment configured to execute a plurality of applications;
   an execution state shift request receiving step of receiving a request for shifting the execution state from the multiplex-execution state to the single-execution state when a plurality of applications are being executed in the multiplex-execution state in the multi-application execution environment;
   an application stop step of forcibly stopping, when the execution state shift request is received in the execution state shift request receiving step, an application other than the application to be executed in the single-execution state in the applications being executed in the multiplex-execution state;
   a first resource release step of releasing a resource used by the applications being executed in the multiplex-execution state in response to the execution state shift request received in the execution state shift request receiving step; and
   a first resource allocation step of allocating the resource released in the first resource release step to the application to be executed in the single-execution state.

13. The method according to claim 12, further comprising:
   a first display step of displaying, in the multiplex-execution state, a list of the plurality of applications executed in the multiplex-execution state; and
   a second display step of individually displaying, in the single-execution state, the single application executed in the single-execution state.

14. The method according to claim 12, wherein
   the resource comprises a distribution resource usable by a plurality of applications,
   the first resource release step releases the distribution resource used by the applications being executed in the multiplex-execution state, and
   the first resource allocation step allocates the distribution resource to the application to be executed in the single-execution state.

15. An application switching method for executing a plurality of applications, the method comprising:
   an execution environment shift step of shifting an execution environment between a multi-application execution environment configured to execute a plurality of applications and a single-application execution environment configured to execute a single application alone;
   an application termination step of forcibly terminating all the applications being executed in the multi-application execution environment in response to a request for shifting the execution environment;
   a second resource release step of releasing a resource used by the applications being executed in the multi-application execution environment in response to a request for shifting the execution environment from the multi-application execution environment to the single-application execution environment;
   a second resource allocation step of allocating the resource released in the second resource release step to the application to be executed in the single-application execution environment; and
   a single-application execution step of executing the application to be executed in the single-application execution environment after the execution environment is shifted to the single-application execution environment in the execution environment shift step.

16. The method according to claim 15, further comprising:
   a first display step of displaying, in the multiplex-execution state, a list of the plurality of applications executed in the multiplex-execution state; and
   a second display step of individually displaying, in the single-execution state, the single application executed in the single-execution state.

17. The method according to claim 15, wherein
   the resource comprises an exclusive resource usable by a single application alone and a distribution resource usable by a plurality of applications,
   the second resource release step releases the distribution resource and the exclusive resource used by the applications being executed in the multi-application execution environment in the single-execution state, and
   the second resource allocation step allocates the distribution resource and the exclusive resource to the application to be executed in the single-execution state.

18. An application switching method for executing a plurality of applications, the method comprising:
   an execution state shift step of shifting an execution state between a multiplex-execution state for executing a plurality of applications and a single-execution state for executing a single application in a multi-application execution environment configured to execute a plurality of applications;
   an execution state shift request receiving step of receiving a request for shifting the execution state from the multiplex-execution state to the single-execution state when a plurality of applications are being executed in the multiplex-execution state in the multi-application execution environment;
   an application stop step of forcibly stopping, in response to the execution state shift request received in the execution state shift request receiving step, an application other than the application to be executed in the single-execution state in the applications being executed in the multiplex-execution state;
   a first resource release step of releasing a resource used by the applications being executed in the multiplex-execution state in response to the execution state shift request received in the execution state shift request receiving step;
   a first resource allocation step of allocating the resource released in the first resource release step to the application to be executed in the single-execution state;
   an execution environment shift step of shifting an execution environment between the multi-application execution environment shifted to the single-execution state in the execution state shift step and a single-application execution environment configured to execute a single application alone;
   an application termination step of forcibly terminating all the applications being executed in the multi-application execution environment in response to a request for shifting the execution environment;
   a second resource release step of releasing a resource used by the applications being executed in the multi-application execution environment in response to a request for shifting the execution environment from the multi-application execution environment to the single-application execution environment;

a second resource allocation step of allocating the resource released in the second resource release step to the application to be executed in the single-application execution environment; and a single-application execution step of executing the application to be executed in the single-application execution environment after the execution environment is shifted to the single-application execution environment in the execution environment shift step.

19. The method according to claim 18, further comprising:

a first display step of displaying, in the multiplex-execution state, a list of the plurality of applications executed in the multiplex-execution state; and a second display step of individually displaying, in the single-execution state, the single application executed in the single-execution state.

20. The method according to claim 18, wherein the resource comprises an exclusive resource usable by a single application alone and a distribution resource usable by a plurality of applications, the first resource release step releases the distribution resource used by the applications being executed in the multiplex-execution state, the first resource allocation step allocates the distribution resource to the application to be executed in the single-execution state, the second resource release step releases the distribution resource and the exclusive resource used by the applications being executed in the multi-application execution environment in the single-execution state, and the second resource allocation step allocates the distribution resource and the exclusive resource to the application to be executed in the single-execution state.

* * * * *